United States Patent
Borst et al.

(10) Patent No.: US 10,142,407 B2
(45) Date of Patent: Nov. 27, 2018

(54) CENTRALIZED LOAD BALANCER WITH WEIGHTED HASH FUNCTION

(71) Applicant: ALCATEL-LUCENT USA, INC., Murray Hill, NJ (US)

(72) Inventors: Simon C. Borst, Convent Station, NJ (US); Iraj Saniee, New Providence, NJ (US); Anwar I. Walid, Watchung, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 321 days.

(21) Appl. No.: 15/198,731

(22) Filed: Jun. 30, 2016

(65) Prior Publication Data
US 2018/0007126 A1  Jan. 4, 2018

(51) Int. Cl.
  *G06F 15/173* (2006.01)
  *H04L 29/08* (2006.01)
  *H04L 12/911* (2013.01)
  *H04L 12/26* (2006.01)

(52) U.S. Cl.
  CPC ...... *H04L 67/1023* (2013.01); *H04L 43/0882* (2013.01); *H04L 43/16* (2013.01); *H04L 47/781* (2013.01); *H04L 67/1008* (2013.01); *H04L 67/1031* (2013.01)

(58) Field of Classification Search
  CPC ............. H04L 67/1023; H04L 67/1031; H04L 67/1008; H04L 43/0882; H04L 43/16; H04L 47/781
  See application file for complete search history.

(56) References Cited

U.S. PATENT DOCUMENTS

| 7,099,915 B1 | 8/2006 | Tenereillo et al. |
| 7,346,686 B2 | 3/2008 | Albert et al. |
| 8,095,935 B2 * | 1/2012 | Paramasivam ......... G06F 9/505 718/105 |
| 2005/0060414 A1 | 3/2005 | Phillips et al. |
| 2013/0263151 A1 | 10/2013 | Jin et al. |

(Continued)

OTHER PUBLICATIONS

"Notification of Transmittal of the International Search Report and Written Opinion of the International Searching Authority, or the Declaration", for PCT/US2017/036748.

(Continued)

*Primary Examiner* — Krisna Lim
(74) *Attorney, Agent, or Firm* — Kramer Amado, P.C.

(57) ABSTRACT

A method, apparatus, and machine readable storage medium is disclosed for balancing loads among a plurality of virtual machines (VMs) from a central dispatcher, wherein the dispatcher receives data packets and maps the data packets to VMs selected from the plurality of VMs, using a weighted hash function, having an associated weighting for each VM and forwarding each packet to a VM accordingly, wherein a load balancer decrements a weighting for a VM, responsive to an indication of the load on the VM exceeding a first load threshold. Weightings can correspond to a number of bins associated with each VM. Weightings are adjusted in response to receiving invite and disinvite messages from the VMs, representing their respective loads.

19 Claims, 6 Drawing Sheets

(56) References Cited

U.S. PATENT DOCUMENTS

2014/0372567 A1* 12/2014 Ganesh ................ H05K 999/99
  709/219
2015/0215236 A1   7/2015 Joshi et al.

OTHER PUBLICATIONS

Shi, et al., "Sequence Preserving Adaptive Load Balancers", Architecture for Networking and Communications Systems, Pro. of the 2006 ACM/IEEE Symposium, IEEE, Piscataway, NJ, USA, Dec. 3, 2006, pp. 143-152.

* cited by examiner

CENTRALIZED LOAD BALANCER WITH WEIGHTED HASH FUNCTION

FIELD OF INVENTION

The invention is directed to computer systems and more specifically, improved loader balancers for data center networks.

BACKGROUND

Servers are arguably the most valuable resource in a data center but due to complexities of connectivity and overbooking in data center networks, servers are often either significantly overused or underused. Effective utilization of servers is a dynamic resource allocation problem which could be remedied with a good load balancer. Conventional wisdom has it that for a load balancer to operate effectively, it requires significant state information from servers and/or virtual machines (VMs). This issue is considered particularly acute if the proposed load balancer is meant to have global oversight over all the servers and VMs in a data center. Additionally, many tasks in the data center involve a sequence of packets (a flow) that are preferably assigned to the same server, thus making the resource allocation problem complex at larger scales. Thus, scalability while preserving flow integrity is a challenge. The assignment of flows to servers and VMs is quite often done poorly, even in small data centers such as the proposed VINE (Virtually Integrated Network Edge)-Scale data centers, resulting in poor utilization of servers.

The reason for the above is that load balancers (LBs) are typically localized to one rack or at best a small cluster of racks in a data center. This limitation comes from the need to avoid large amounts of state information to keep track of jobs in a data center. State-of-art LBs that handle self-contained jobs—meaning the job does not consist of a sequence of packets with the same 5-tuple—typically work with round robin scheduling or a more efficient randomized round robin version implemented via 'hash functions'. When balancing load for flow-based jobs, randomized round robin typically works as follows: All the relevant information for a flow (i.e.: the 5-tuple consisting of source IP address, destination IP address, protocol, source port, and destination port) is read from the packet header and then uniquely mapped via a hash function to a VM address. The hash function ensures that for the set of all VMs, each receives on average an equal fraction of the total number of flows entering the data center and that this mapping is performed efficiently without exchange of state from the servers or VMs to the load balancer. Such a load balancing mechanism for flow-based load balancing can work relatively well if all VMs are homogeneous in performance and flow processing requirements have small variations. In reality, neither of these conditions is generally true, due to a multiplicity of factors but mostly because servers/VMs perform significantly differently from each other even when they are initially equally sized; and flow processing requirements typically have heavy-tailed characteristics with large variability. These two factors can result in ineffective and often massive under/over-utilization of servers/VMs in a data center with traditional and even state-of-art load balancers. In the networking and queuing literature, alternative dynamic load balancers have been proposed that can alleviate these issues to some extent. However, these load balancers typically lack a notion of flow awareness for packetized traffic and incur communication overhead in obtaining state information that is prohibitive in practice, resulting in poor scalability. An example of such schemes is the family of randomized round robin schedulers (sometimes referred to as 'power of k' schedulers), where the state of k randomly selected servers/VMs is checked and the allocation is made to the least-loaded server/VM. Further examples are schemes in which the servers request jobs from a centralized queue when they are idle.

Therefore, improvements to load balancers in general and centralized load balancers in particular, would be highly desirable.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method for balancing loads among a plurality of virtual machines (VM) from a central dispatcher. The method comprises steps of: receiving a data packet at the dispatcher; mapping the data packet to a first VM selected from the plurality of VMs, using a weighted hash function, having an associated weighting for each VM; and forwarding the packet to the first VM, wherein a load balancer decrements a weighting for the first VM of the weighted hash function, responsive to an indication of the load on the first VM exceeding a first load threshold.

In various alternative embodiments, the indication of the load on the first VM exceeding a first load threshold comprises receiving a disinvite message from the first VM.

In various alternative embodiments, the load balancer increments a weighting for a second VM, responsive to an indication of the load on the second VM falling below a second load threshold.

In various alternative embodiments, the indication of the load on the second VM falling below a second load threshold comprises receiving an invite message from the second VM.

In various alternative embodiments, mapping the data packet to a first VM comprises mapping the data packet to a first bin selected from a plurality of bins associated with the first VM, wherein the weighting for each VM corresponds to a number of bins associated with the each VM.

In various alternative embodiments, the load balancer decrements a weighting for the first VM, responsive to receiving the disinvite message, and further comprises steps of: determining which bin from among the plurality of bins associated with the first VM is least active; reassigning the least active bin to a third VM having a load less than a second load threshold, and incrementing the weighting for the third VM accordingly.

In various alternative embodiments, determining which bin from among the plurality of bins associated with the first VM is the least active, comprises monitoring traffic to each bin of the plurality of bins for a predetermined time interval and determining which bin from among the plurality of bins associated with the first VM, has the minimum number of packet arrivals for the predetermined time interval.

In various alternative embodiments, determining which bin is least active comprises determining which bin from among the plurality of bins associated with the first VM, has the maximum packet inter-arrival gap for the predetermined time interval.

In various alternative embodiments, the load balancer determines that the third VM has a load less than the second load threshold, responsive to receiving an invite message from the third VM.

Other embodiments provide a centralized load balancer for balancing loads among a plurality of virtual machines (VMs) from a central dispatcher. The load balancer comprises: a dispatcher for receiving data packets and for forwarding the data packets to the plurality of VMs; a processor; and memory. The memory comprises program instructions executable by the processor for: receiving a data packet at the dispatcher; mapping the data packet to a first VM selected from the plurality of VMs, using a weighted hash function, having an associated weighting for each VM; and forwarding the packet to the first VM, wherein the load balancer decrements a weighting for the first VM of the weighted hash function, responsive to an indication of the load on the first VM exceeding a first load threshold.

Other embodiments provide a tangible and non-transitory machine-readable storage medium encoded with instructions thereon for execution by a centralized load balancer, wherein the tangible and non-transitory machine-readable storage medium comprises instructions for: receiving a data packet at the dispatcher; mapping the data packet to a first VM selected from the plurality of VMs, using a weighted hash function, having an associated weighting for each VM; forwarding the packet to the first VM; and decrementing a weighting for the first VM of the weighted hash function, responsive to an indication of the load on the first VM exceeding a first load threshold.

BRIEF DESCRIPTION OF THE FIGURES

Some embodiments of apparatus and/or methods in accordance with embodiments of the present invention are now described, by way of example only, and with reference to the accompanying drawings in which.

In the figures, like features are denoted by like reference characters.

DETAILED DESCRIPTION

Figure 1:
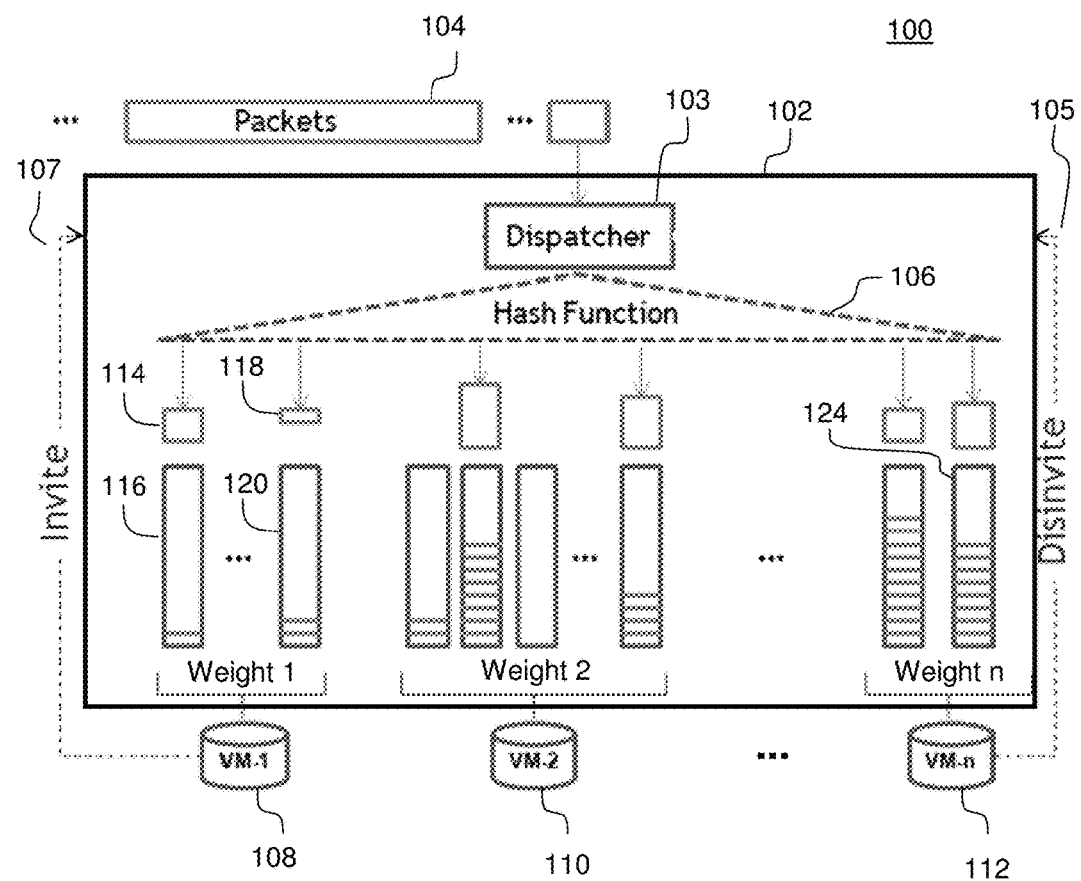
FIG. 1 illustrates a block diagram of a centralized load balancer with weighted hash function.

Embodiments of a centralized load balancer (CLB), or a controller will be described, for the assignment of flows to servers/VMs with focus on small, VINE-scale data centers, that is, in the order of 100 racks of servers, as envisioned in the Virtually Integrated Network Edge (VINE) which acts as a software defined network (SDN)/virtualization element for both wireless and wired access to the network and the Internet.

The described embodiments, in the context of VINE-scale data centers, can result in significantly better utilization of the servers and VMs and also enable significantly better response time, service-time jitter, loss and other metrics related to QoS, some of which are central to the smooth operation of emerging access node technologies, for example: virtualized Internet Protocol Multimedia Subsystem (vIMS); virtualized Server Gateway (vSGW); virtualized Border Gateway (vBGW); and virtualized content delivery networks (vCDN).

Various embodiments create a weighted hash function that maps flows to VMs in a biased, rather than uniform, manner. Weights are adjusted based on active VM guidance through an 'invite/disinvite' scheme. The bias referred to in the previous sentence is calculated based on load indicators as proxies for the actual performance of the VMs during a pre-specified time window. The 'invite' and 'disinvite' messages from servers/VMs are the feedback that servers/VMs provide to the load balancer to re-adjust the weights for the hash function.

The "invite stack" is fed by invite messages received from various VMs and controlled by the load balancer as it reassigns bins to VMs, based on invite messages, in response to disinvite messages. After reassigning the least active bin to a particular VM having message in the inviter stack, the invite message is deleted from the invite stack.

Referring now to the drawings, in which like numerals refer to like components or steps, there are disclosed broad aspects of various exemplary embodiments.

FIG. 1 illustrates a block diagram of a centralized load balancer 102 which receives incoming packets 104 and forwards them to VMs 108, 110, 112 using a weighted hash function with a bin mechanism, as will be described. Dispatcher 103 (not a queuing element) receives incoming packets 104 and maps the incoming packets via a static hash function 106 to a sufficiently large number of bins 116, 120 (typically a factor ~10 more bins than the number of VMs). Thus, for example incoming packet 114 has been assigned to bin 116 and incoming packet 118 has been assigned to bin 120. The dispatcher 103 then determines which VM is associated with bin 116 and forwards the incoming packet 116 to that VM (108). Note that the depiction of bins in FIG. 1 illustrates virtual bins (116, 120, . . . , 124), not queues. The incoming packets are physically queued at the VMs (108, 110, . . . , 112).

Load balancer 102 maintains a dynamic bin table (see Table 1) which stores the assignment of bins to VMs. In a background process, Load balancer 102 determines which bins to associate with each VM, based on 'weights' that it also computes. Initially, each VM is associated with the same number of bins. The assignment of bins to VMs is stored in a dynamic Bin Table as shown in Table 1. Once an incoming packet has been mapped to a specific bin via the static hash function, a look-up is performed in this bin table, and the packet is then forwarded to the associated VM.

The hash function should work in a deterministic and fast way. Preferably, all packets belonging to the same flow should be mapped to the same server/VM. This is sometimes referred to as 'stickiness'. In order to achieve stickiness, bin timers are associated with each bin as shown in Table 1, to determine when a flow has logically ended and the bin may thus be re-assigned to a new server/VM even if the hash value is the same as one that was previously mapped to a different server/VM.

As invite/disinvite feedback is received for over-loaded and under-loaded VMs, and packet arrivals for bins associated with disinvite messages are tracked, the bins are dynamically reassigned, and the bin table is updated accordingly. The dynamic Bin Table for a typical VINE data center is of the order of 100,000 two-column entries which are easily processed in microseconds or faster by standard packet processors. Typical values of Bin Timers are on the order of 10 ms. The bin timer tracks the most recent time that a packet was hashed into a particular bin and provides a proxy for the level of traffic activity of flows associated with that bin. This in turn provides an estimate for the potential degree of disruption (stickiness violation) when reassigning the bin to a different VM.

TABLE 1

Bin Table managed by Load Balancer

| Bin | Associated VM | Flag | Bin Timer |
|---|---|---|---|
| Bin 1 | VM 3 | 1 | 10 |
| Bin 2 | VM 1 | 0 | 50 |
| Bin 3 | VM 3 | 1 | 1000 |
| ... | ... | ... | ... |
| Bin m | VM m | 0 | BT m |

Load balancer 102 optionally maintains a table (see Table 2) of invite/disinvite status of each VM when there are no spare bins to reallocate at the time of an invite/disinvite request. This status is maintained in an invite stack, which can be a time-ordered LIFO (last in, first out) list. Table 2 can also display hash weights (for example, number of associated bins) for each VM, which are typically an integer value and can be on the order of 1, 2, 3, 10, 20. The hash weights are managed through the invite/disinvite process and the bin table.

TABLE 2 at Load Balancer

| VM | Invite/Disinvite | Hash Weighting |
|---|---|---|
| VM 1 | Invite | 10 |
| VM 2 | Disinvite | 1 |
| ... | ... | 50 |
| VM n | I/DI n | HW n |

Figure 2:
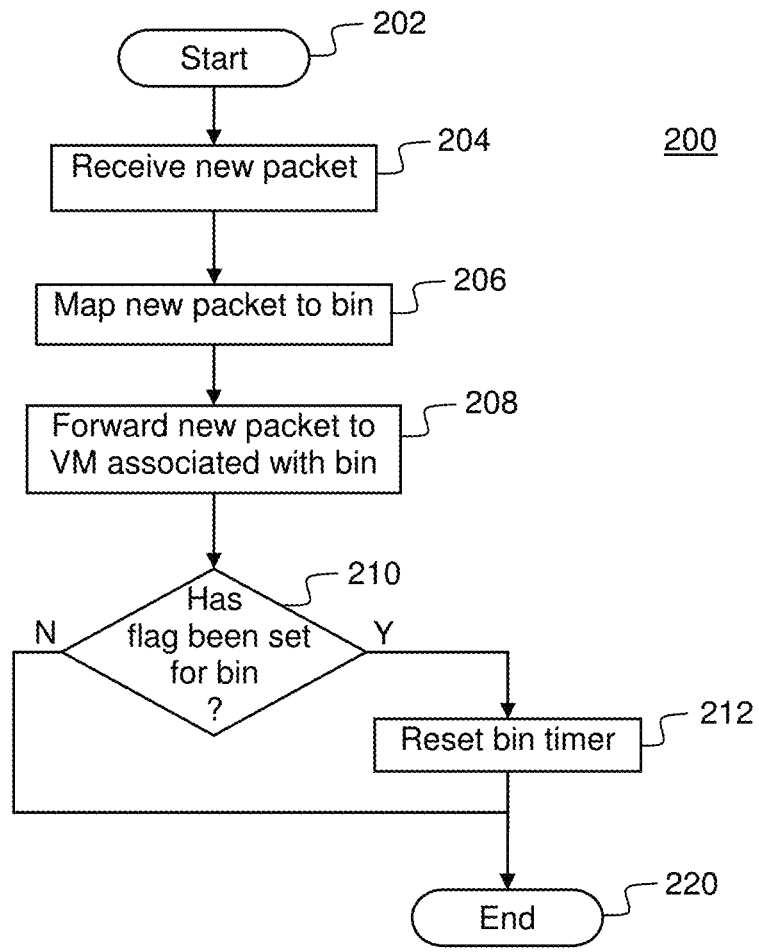
FIG. 2 illustrates a process flow diagram for processing a data packet at a centralized dispatcher.

FIG. 2 illustrates a process flow diagram for processing a data packet at Load Balancer 102. The process starts at step 202. At step 204, dispatcher 103 receives a new incoming packet. At step 206, dispatcher 103 uses hash function 106 to calculate a hash value based on the packet flow five-tuple in the packet header, and then maps the incoming packet to a bin corresponding to the calculated hash value. At step 208, dispatcher 103 use the bin table (Table 1) to look up the VM associated with the bin to which the incoming packet has been mapped, and then forwards the packet to the associated VM. At step 210, dispatcher 103 determines if flag has been set for the bin and if so, at step 212, dispatcher 103 resets the bin timer. The process then ends at step 220.

Figures 3, 4:
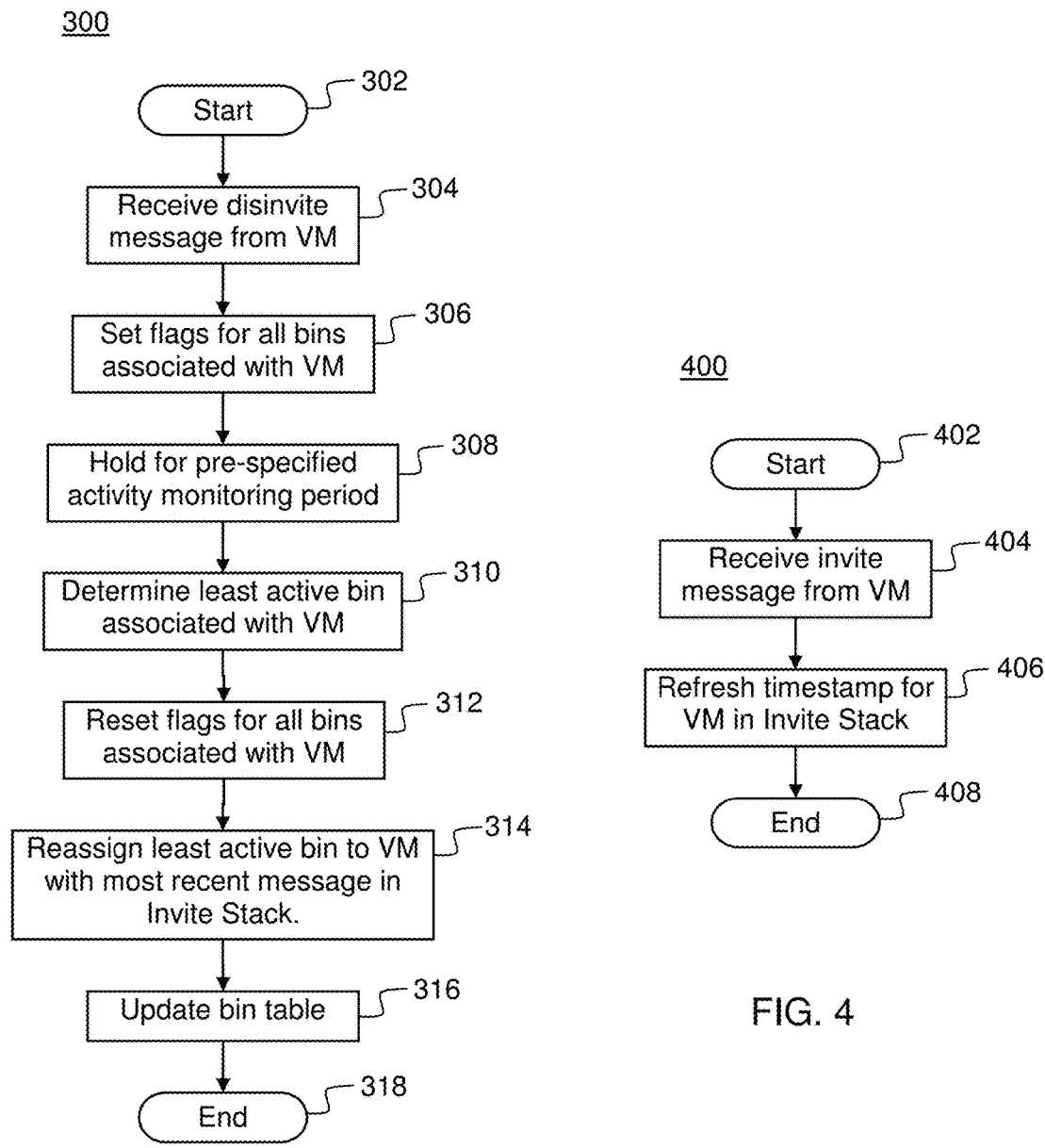
FIG. 3 illustrates a process flow diagram for processing a disinvite message at a centralized load balancer.
FIG. 4 illustrates a process flow diagram for processing an invite message at a centralized load balancer.

Load balancer 102 can receive disinvite messages 105 from various VMs (108, 110 . . . 112), asynchronously from incoming packet traffic. FIG. 3 illustrates a process flow diagram for processing a disinvite message at load balancer 102. The process starts at step 302. At step 304, load balancer 102 receives a disinvite message 105 from a VM. At step 306, load balancer 102 sets flags in the bin table (Table 1) for all the bins currently assigned to that VM. At step 308, load balancer 102 waits for a pre-specified activity monitoring period while at step 310, the load balancer 102 determines the least active bin associated with the VM (from among the bins with the flag set) in terms of the maximum bin timer value, the minimum number of packet arrivals or the maximum packet inter-arrival gap. At step 312, load balancer 102 resets all the flags associated with the VM. At step 314, load balancer 102 reassigns the identified least active bin to another VM with most recent message in the invite stack. Note that this may potentially result in redirecting packets of any ongoing flows mapped into that bin to a different VM.

At step 316, load balancer 102 updates the bin table (Table 1) to reflect the reassignment of the aforementioned identified least active bin. The process ends at step 318.

Before the 'weights' are adjusted in case of a disinvite message, the dispatcher starts tracking the numbers and/or arrival times of arriving packets for the bins (hash values) currently assigned to that server/VM. The dispatcher then reassigns the bin (hash value) that is determined to be the least active, e.g., in terms of the largest bin timer value, the minimum number of packet arrivals or the maximum packet inter-arrival gap, ensuring a low likelihood of redirecting the packets of any ongoing flows to a different server/VM. As a result, the operation of invite/disinvite feedback is typically slower than completion times of flows, which are typically slower than processing of a single packets. Thus, the dynamics of weight adjustment for the described embodiments for flow-aware load balancer is slower than it would be for a flow-unaware packet scheduling load balancer. Simulations have shown more than adequate responsiveness to invite/disinvite messages due to under-load/over-load conditions. Deterministic and stickiness-of-flow mapping to servers/VMs helps to ensure that the packets of each flow follows an identical path in the data center and are not disrupted/split along different paths, resulting in need for reassembly.

FIG. 4 illustrates a process flow diagram for processing an invite message at a centralized dispatcher. The process starts at step 402. At step 404, load balancer 102 receives an invite message 107 from a VM. At step 406, load balancer 102 refreshes the timestamp for the VM in the invite stack. The process ends at step 408.

An enhancement to the above scheme involves exogenous determination of long-lived flows thus further improving the performance of CBL, as follows. Since incoming flows to the dispatcher are likely to be a mix of 'elephant flows' (e.g. long-lived with high packet rate) and 'mice flows' (e.g. short-lived with low packet rate), load balancing may be further improved by using a bin table for elephant flows and a separate bin table for mice flows. Elephant flows may be immediately detected using known techniques based on TCP port information or application signature. The resulting two bin tables should enable flexibility and finer load balancing granularity. For example, a two-tier load balancing may be achieved, with elephant flows assigned to servers at a slow time scale, while mice flows are assigned at a faster time scale.

Each of the VMs maintains a simple load estimate, e.g. via geometric smoothing so as to minimize the memory requirement. Every time the load estimate is updated, (for example, at regular intervals) it is checked whether the load has dropped below or is above certain target values, and in these cases either an invite (below target load 1) or disinvite (above target load 2) message is sent to the dispatcher, respectively. The frequency of the load updates, and hence the frequency of the invite and disinvite messages, should be commensurate with the time scale of the load smoothing, and are chosen so as to achieve an optimal trade-off between the responsiveness to load variations at the VMs and the amount of information exchange with the dispatcher resulting from the invite and disinvite messages. The lower and upper limits for the target load range are further design parameters, which are either set based on empirical findings or optimized through learning techniques, and are also selected to strike an optimal balance between the agility of the load balancer and the degree of communication overhead.

Figure 5:
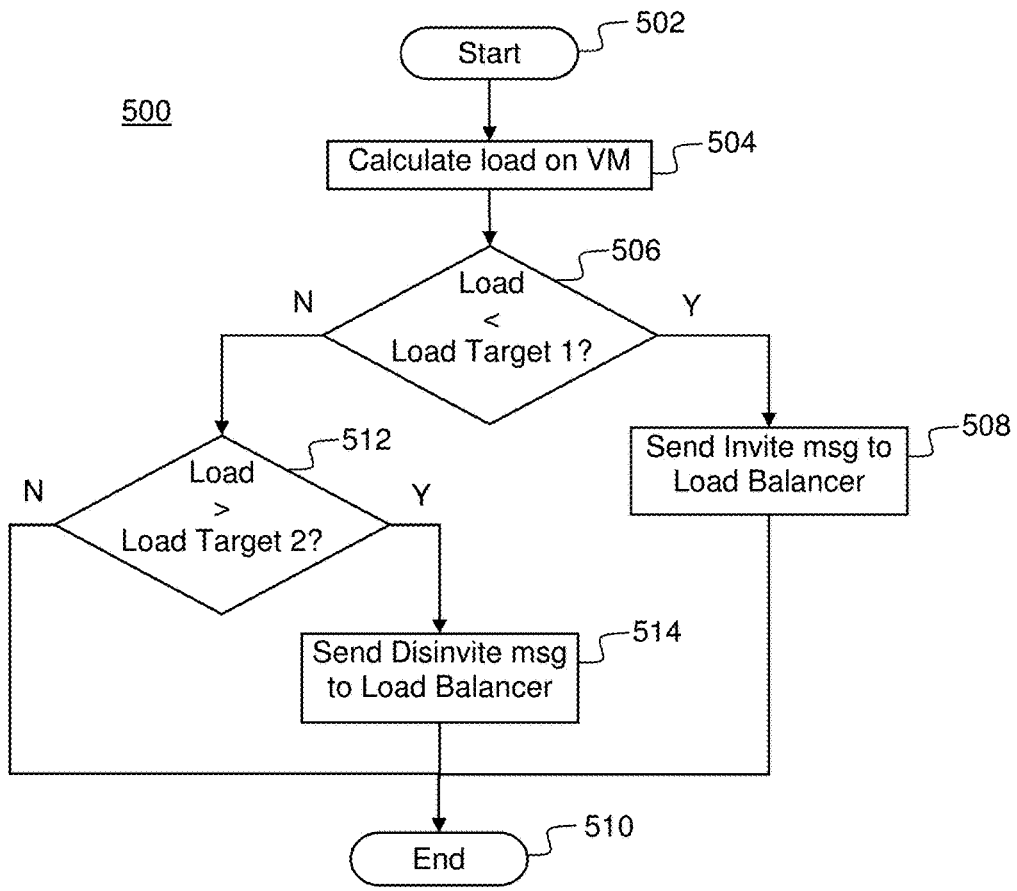
FIG. 5 illustrates a process flow diagram for processing load information at a VM.

FIG. 5 illustrates a process flow diagram for processing load information at a VM. The process starts at step 502. At step 504 the VM calculates a load estimate as described above. At step 506, the VM determines if the load is below a preset load target 1 and if so, at step 508 the VM sends an invite message to the load balancer 102 and the process ends at step 510. If at step 506, the VM determines that the load is not below preset load target 1, then at step 512, the VM determines if the load is greater than a preset load target 2 and if so, at step 514 the VM sends a disinvite message to the load balancer 102 and the process ends at step 510. If at step 512 the VM determines that the load is not greater than preset load target 2 then the process ends at step 510. The thresholds load target 1 and load target 2 are set so that these are invoked rarely except when there is very large mismatch between the nominal load target and the actual observed load.

Figure 6:
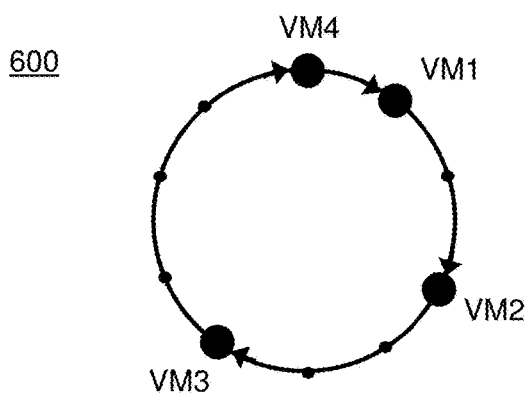
FIG. 6 illustrates an abstract representation of an alternate embodiment of a weighted hash function.

The above description describes exemplary embodiments using bins to implement the weighting of the weighted hash function. It should be understood that other embodiments are contemplated, such as, for example using a data structure 600 as represented in the abstract graph in FIG. 6. The circle represents a total weighting of 100. In this example, four VMs: VM1, VM2, VM3, VM4 are assigned weightings of 10, 20, 30, and 40 respectively, as illustrated by the distribution of the VMs around the circle, the length of each circle segment representing the weighting of the respective VM. As data packets are received by the dispatcher, the 5-tuples of the packets are uniformly mapped around the circumference of the circle by the hash function. VMs having a higher weighting will be assigned proportionally more data flows than VMs having lower weighting.

Figure 7:
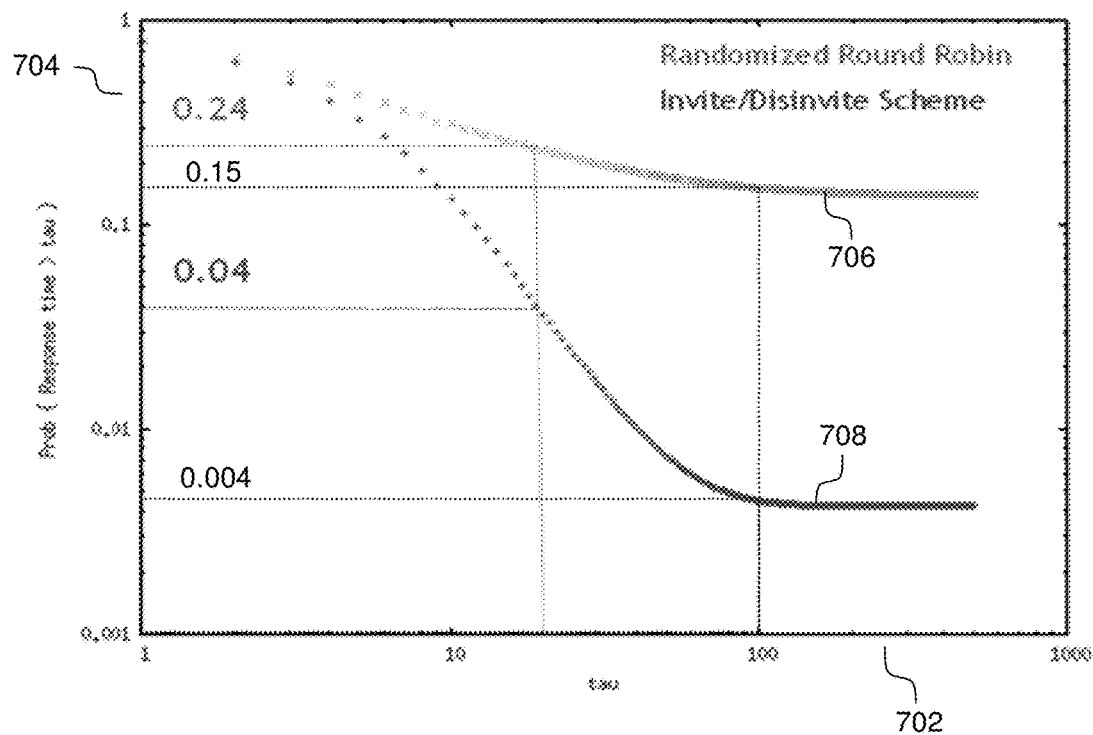
FIG. 7 illustrates empirical comparative response times using an invite/disinvite scheme.

FIG. 7 illustrates sample empirical comparative processing times of packets using embodiments of the described invite-disinvite scheme 708 compared to processing times of packets using state-of-art randomized round robin schedulers 706, based on lab simulations. As can be seen, 4% (0.04 probability) of the packets exceed 20 ms response time for the described invite-disinvite scheme 708 compared to 24% of the packets exceeding 20 ms response time for the state-of-art randomized round robin scheme 706, and 0.4% of the packets exceed 100 ms response time for the described invite-disinvite scheme 708 compared to 15% for the state-of-art randomized round robin scheme 706.

Figure 8:
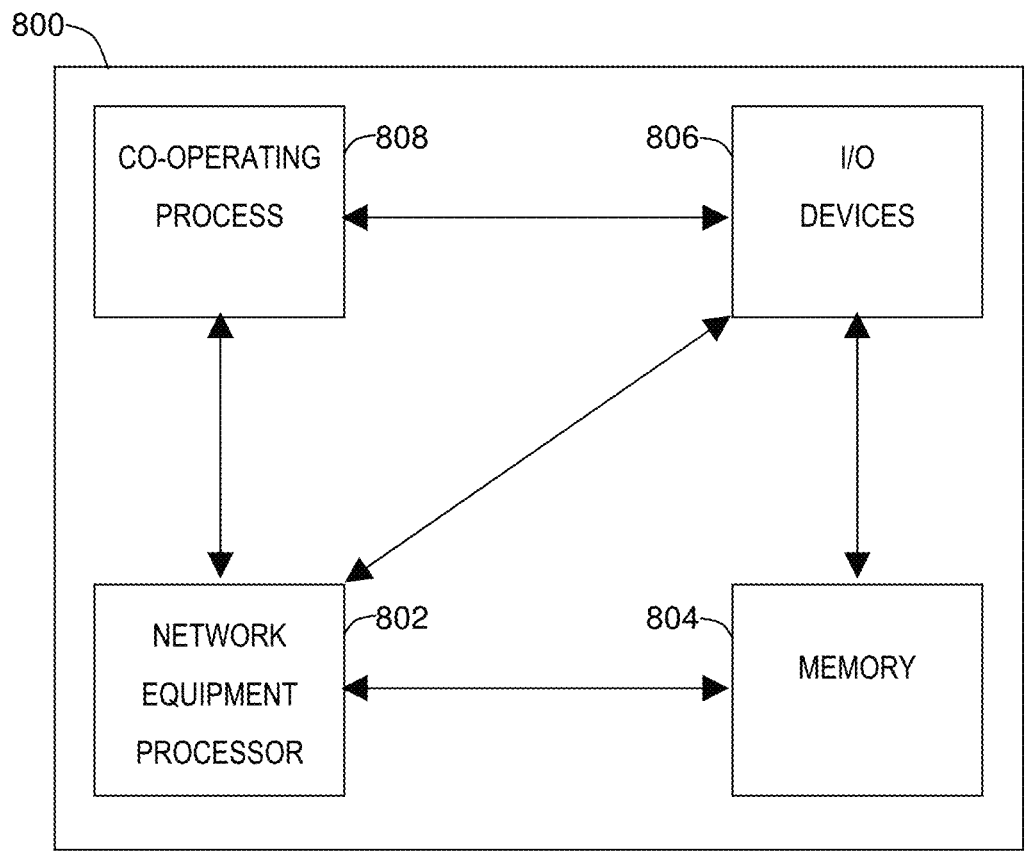
FIG. 8 illustrates a high-level block diagram of a network equipment processor assembly.

FIG. 8 depicts a high-level block diagram of a network equipment processor assembly suitable for use in performing functions described herein.

As depicted in FIG. 8, network equipment processor assembly 800 includes a network equipment processor element 802 (e.g., a central processing unit (CPU) and/or other suitable processor(s)), a memory 804 (e.g., random access memory (RAM), read only memory (ROM), and the like), a cooperating module/process 808, and various input/output devices 806 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in hardware, for example using one or more application specific integrated circuits (ASIC), and/or any other hardware equivalents. Alternatively, according to one embodiment, the cooperating process 808 can be loaded into memory 804 and executed by network equipment processor 802 to implement the functions as discussed herein. As well, cooperating process 808 (including associated data structures) can be stored on a tangible, non-transitory computer readable storage medium, for example magnetic or optical drive or diskette, semiconductor memory and the like.

It is contemplated that some of the steps discussed herein as methods may be implemented within hardware, for example, as circuitry that cooperates with the network equipment processor to perform various method steps. Portions of the functions/elements described herein may be implemented as a computer program product wherein computer instructions, when processed by a network equipment processor, adapt the operation of the network equipment processor such that the methods and/or techniques described herein are invoked or otherwise provided. Instructions for invoking the inventive methods may be stored in fixed or removable media, and/or stored within a memory within a computing device operating according to the instructions.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Numerous modifications, variations and adaptations may be made to the embodiment of the invention described above without departing from the scope of the invention, which is defined in the claims.

What is claimed is:

1. A method for balancing loads among a plurality of virtual machines (VM) from a central dispatcher, the method comprising steps of:
   receiving a data packet at said dispatcher;
   mapping said data packet to a first VM selected from the plurality of VMs, using a weighted hash function, having an associated weighting for each VM; and
   forwarding said packet to said first VM,
   wherein a load balancer decrements a weighting for said first VM of said weighted hash function, responsive to an indication of the load on said first VM exceeding a first load threshold.

2. The method of claim 1, wherein said indication of the load on said first VM exceeding a first load threshold comprises receiving a disinvite message from said first VM.

3. The method of claim 2, wherein said load balancer increments a weighting for a second VM, responsive to an indication of the load on said second VM falling below a second load threshold.

4. The method of claim 3, wherein said indication of the load on said second VM falling below a second load threshold comprises receiving an invite message from said second VM.

5. The method of claim 4, wherein said mapping said data packet to a first VM comprises mapping said data packet to a first bin selected from a plurality of bins associated with said first VM,
   wherein the weighting for each VM corresponds to a number of bins associated with said each VM.

6. The method of claim 5, wherein said load balancer decrements a weighting for said first VM, responsive to receiving said disinvite message, further comprising steps of:
   determining which bin from among the plurality of bins associated with said first VM is least active;
   reassigning said least active bin to a third VM having a load less than a second load threshold; and
   incrementing the weighting for said third VM accordingly.

7. The method of claim 6, wherein said determining which bin from among the plurality of bins associated with said first VM is the least active, comprises monitoring traffic to each bin of said plurality of bins for a predetermined time interval and determining which bin from among the plurality of bins associated with said first VM, has the minimum number of packet arrivals for said predetermined time interval.

8. The method of claim 7, wherein said determining which bin is least active comprises determining which bin from among the plurality of bins associated with said first VM, has the maximum packet inter-arrival gap for said predetermined time interval.

9. The method of claim 6, wherein said load balancer determines that said third VM has a load less than said second load threshold, responsive to receiving an invite message from said third VM.

10. A centralized load balancer for balancing loads among a plurality of virtual machines (VMs) from a central dispatcher, said load balancer comprising:
    a dispatcher for receiving data packets and for forwarding said data packets to said plurality of VMs;
    a processor and memory, said memory further comprising program instructions executable by said processor for:
      receiving a data packet at said dispatcher;
      mapping said data packet to a first VM selected from the plurality of VMs, using a weighted hash function, having an associated weighting for each VM; and
      forwarding said packet to said first VM,
      wherein said load balancer decrements a weighting for said first VM of said weighted hash function, responsive to an indication of the load on said first VM exceeding a first load threshold.

11. The centralized load balancer of claim 10, wherein said indication of the load on said first VM exceeding a first load threshold comprises receiving a disinvite message from said first VM.

12. The centralized load balancer of claim 11, further comprising program instructions for incrementing a weighting for a second VM, responsive to an indication of the load on said second VM falling below a second load threshold.

13. The centralized load balancer of claim 12, wherein said indication of the load on said second VM falling below a second load threshold comprises receiving an invite message from said second VM.

14. The centralized load balancer of claim 13, wherein said mapping said data packet to a first VM comprises mapping said data packet to a first bin selected from a plurality of bins associated with said first VM,
    wherein the weighting for each VM corresponds to a number of bins associated with said each VM.

15. The centralized load balancer of claim 14, wherein said program instructions for decrementing a weighting for said first VM, responsive to receiving said disinvite message, further comprise steps of:
  determining which bin from among the plurality of bins associated with said first VM is least active;
  reassigning said least active bin to a third VM having a load less than a second load threshold.

16. The centralized load balancer of claim 15, wherein said program instructions for determining which bin from among the plurality of bins associated with said first VM is the least active, comprise monitoring traffic to each bin of said plurality of bins for a predetermined time interval and determining which bin from among the plurality of bins associated with said first VM, has the minimum number of packet arrivals for said predetermined time interval.

17. The centralized load balancer of claim 16, wherein said program instructions for determining which bin is least active comprises determining which bin from among the plurality of bins associated with said first VM, has the maximum packet inter-arrival gap for said predetermined time interval.

18. The centralized load balancer of claim 17, wherein said program instructions further comprise determining that said third VM has a load less than said second load threshold, responsive to receiving an invite message from said third VM.

19. A tangible and non-transitory machine-readable storage medium encoded with instructions thereon for execution by a centralized load balancer, wherein the tangible and non-transitory machine-readable storage medium comprises instructions for:
  receiving a data packet at said dispatcher;
  mapping said data packet to a first VM selected from the plurality of VMs, using a weighted hash function, having an associated weighting for each VM;
  forwarding said packet to said first VM; and
  decrementing a weighting for said first VM of said weighted hash function, responsive to an indication of the load on said first VM exceeding a first load threshold.

* * * * *